MAGNETIC AMPLIFIER WITH HALF-WAVE PHASE REVERSAL TYPE OUTPUT

Filed June 30, 1952

INVENTORS
CARROLL W. LUFCY
ALBERT E. SCHMID JR

BY G. D. O'Brien
R. M. Hicks
ATTORNEYS 2,734,165
Patented Feb. 7, 1956

2,734,165

MAGNETIC AMPLIFIER WITH HALF-WAVE PHASE REVERSAL TYPE OUTPUT

Carroll W. Lufcy, Silver Spring, and Albert E. Schmid, Jr., Greenbelt, Md., assignors to the United States of America as represented by the Secretary of the Navy Application June 30, 1952, Serial No. 296,527
3 Claims. (Cl. 323—89)
(Granted under Title 35, U. S. Code (1952), sec. 266)

The invention described herein may be manufactured and used by or for the Government of the United Sttaes of America for governmental purposes without the payment of any royalties thereon or therefor.

This invention comprises novel and useful improvements in magnetic amplifiers and more particularly pertains to a half-wave bridge-type magnetic amplifier.

In the application of magnetic amplifiers to servo systems, major difficulties have been encountered due to the slow speed of response of the magnetic amplifier. Although the magnetic amplifier has a minimum response time of one cycle of the supply or carrier frequency, this minimum time is usually not obtained in conventional circuitry. As a result, serious stability problems are encountered if such an amplifier is placed in a high performance servo loop.

Instrument servos generally use a two-phase induction motor as the power drive and synchro units for error detection. It is thus necessary that the servo amplifier be capable of receiving a phase reversible A. C. signal and delivering a phase reversible A. C. output, the magnitude and phase of which output is correlative with the amplitude and phase of the input signal. In order to achieve the minimum speed of response in the magnetic amplifier which is required for high-performance servo-system applications, half-wave circuitry is utilized, which circuitry can be made to have an inherent speed of response of one cycle of the supply or carrier frequency. By employing bridge-type half-wave circuitry, an output voltage correlative in magnitude and phase with the amplitude and phase of the input signal is obtained. The output of the bridge-type half-wave magnetic amplifier, although unidirectional for any given phase sense input, is a signal having a wave form which contains a high fundamental A. C. component, which component may be utilized to operate either a D. C. load or an A. C. load such as a two phase A. C. induction motor of the type conventionally used in instrument servos.

An important object of this invention is to provide a magnetic amplifier having high gain and a time response not exceeding one cycle of the supply voltage per stage of amplification.

Another object of this invention is to provide a magnetic amplifier of the half-wave type having phase reversible output and in which amplifier the voltages induced in the control winding due to coupling with the load windings are small.

A further object of this invention is to provide a multistage magnetic amplifier having half-wave phase reversible output in which coupling of the successive stages is achieved without the use of passive elements thereby increasing the overall gain of the amplifier.

Other objects and many of the attendant advantages of this invention will be readily appreciated as the same becomes better understood by reference to the following detailed description when considered in connection with the accompanying drawings wherein.

Figure 1:
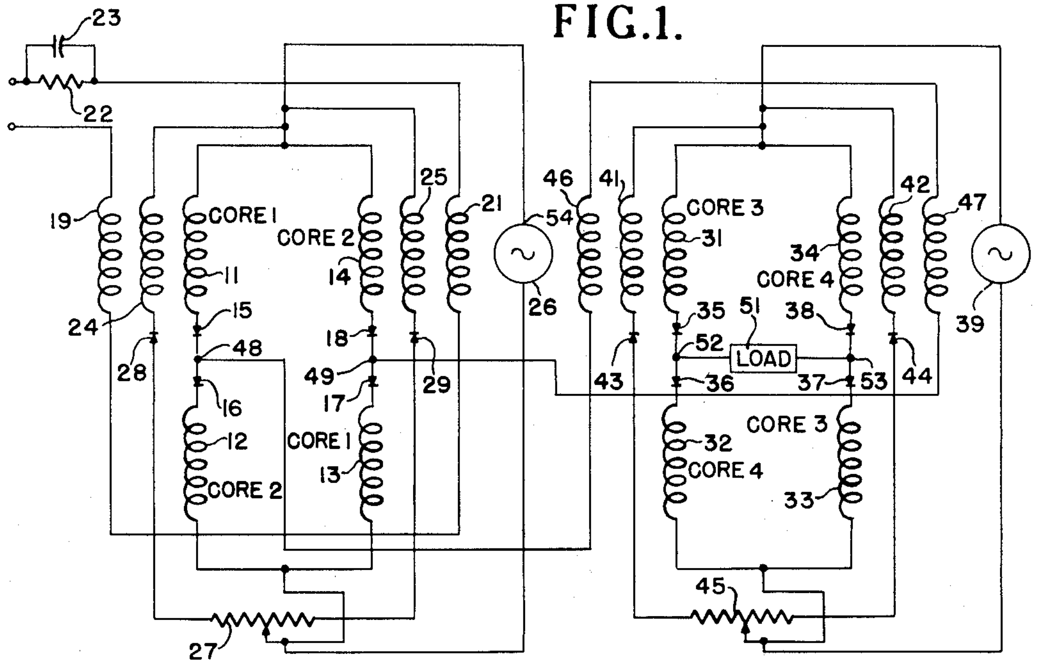
Fig. 1 is a schematic diagram of a bridge-type half wave magnetic amplifier employing half-wave reference circuitry.

The amplifier illustrated in Fig. 1 of the drawings comprises a two-stage circuit, the bridge circuit of the first stage comprising power windings 11, 12, 13 and 14 and rectifiers 15, 16, 17 and 18, the latter preferably being of dry-disk type. Power windings 11 and 13 which constitute one pair of opposing legs of the bridge circuit are wound on one reactor core designated core 1 and windings 12 and 14 which constitute the other pair of opposing legs of the bridge are wound on a second reactor core designated as core 2. It is preferable to wind the opposite legs of the bridge circuit on the same core since, for balanced operation, the opposite legs must act together. In this way uniform operation is insured. Alternatively, each of the power windings may be wound on separate reactor cores. Additionally, one pair of adjacent legs of the bridge, such as 12 and 13 may comprise other impedance elements.

For half-wave operation only two rectifiers 15, 18 or 16, 17 are absolutely necessary. In the circuit of Fig. 1, however, all four rectifiers are utilized to eliminate circulating currents in the legs of the bridge. It is to be noted that the load circuit, which may either be the control windings of the succeeding stage or a motor, is completely isolated from the bridge proper in that voltages induced in the load circuit cannot produce currents in the bridge.

In half-wave circuitry, the non-operating half cycle of the supply voltage, hereinafter referred to as the flux-setting half cycle, is available for the purpose of establishing control. During the flux-setting half cycle, the power winding circuit is inactive and its effect upon the control may be neglected. Fundamentally, the requirement of control is to establish the desired flux level in the reactor during the flux-setting half cycle, which flux level determines the firing angle of the reactor on its operating half cycle. It is not necessary that all core losses involved in setting the flux level be supplied by the control source, and for this purpose reference windings 24 and 25 are provided, which windings serve the purpose of presetting a definite flux level in each reactor during the flux-setting half cycle.

Figure 3:
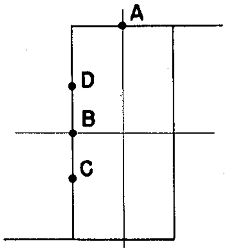
Fig. 3 is a curve illustrating the B-H loop characteristics of a reactor.

Fig. 3 illustrates a B-H loop which may be assumed to represent either reactor in the bridge because both are cycling around their respective loops in the same way at the same time when the bridge is balanced. At the end of the operating half cycle, the reactor flux returns to residual point A. The reference windings serve to preset the flux level indicated at point B in each reactor during the flux setting half cycle, the power to energize the reference windings being supplied by the source 26 through potentiometer 27 and rectifiers 28 and 29. The control source, therefore, only has to supply the incremental power to override the reference windings and shift the flux either up or down from point B to points D or C, determined by the polarity of the control signal during the flux-setting half cycle. Core materials such as orthonol have a very rectangular hysteresis loop and the incremental power to be supplied by the control source is small.

The output-stage bridge circuit includes load windings 31, 32, 33 and 34 and rectifiers 35, 36, 37 and 38, which bridge circuit is energized 180° out of phase with the bridge circuit in the preceding input stage by power source 39. Obviously the same power source may be utilized for both stages. As in the input stage, opposite legs of the bridge are wound on the same reactor, load windings 31 and 33 being wound on a reactor designated core 3 and windings 32 and 34 being wound on a reactor designated core 4. The reference circuit includes reference windings 41 and 42, rectifiers 43 and 44 and potentiometer 45, the rectifiers 43 and 44 being arranged so that the respective reference windings are energized during the flux setting half cycle of supply voltage from source 39. Control is established by control windings 46 and 47 which are directly connected to the output terminals 48 and 49 of the input stage which control windings constitute the input stage load. The load 51 for the output stage is connected across output terminals 52 and 53, which load may be a servo-motor.

The load windings 11, 12, 13 and 14 of the input stage are active only when the A. C. voltage from source 26 is positive at point 54. At the beginning of the operating half cycle, when point 54 goes positive, the flux rises up the B-H loop to saturation where it remains until the end of the positive half cycle at which time the flux returns to residual point A. During this period no current flows through reference windings 24 and 25 because of rectifiers 28 and 29. During the succeeding half cycle of supply voltage, line polarity is reversed and no current flows through load windings 11, 12, 13 and 14, but current does flow through reference windings 24 and 25 and sets up a magnetomotive force on the reactors opposite to that in the load windings and hence the flux change brought about in the reactor is opposite. Thus, with zero control winding current the flux can be made to move to a predetermined level such as point B by the action of the reference windings. The reference level is set by proper adjustment of the number of turns in the reference windings and the total impedance in each reference circuit, which impedance may be supplied by potentiometer 27. Since by proper adjustment of potentiometer 27, the reactors may be preset to the same reference flux level, cores having different coercive forces can be in the same circuit provided the cores have substantially the same incremental A. C. permeability in the region about the reference level.

Ideally, if a control circuit contained no resistance, the amount of flux change in a reactor by a voltage $E_c$ is given by Faraday's law as:

$$\Delta\phi=\frac{1}{N}\int E_c dt$$

where N is the number of turns in the control winding and $\int E_c dt$ is the time integral of the voltage across the control winding over the flux setting half cycle.

It is qualitatively apparent that for a given level of control [i. e. $\int E_c dt$ fixed] the maximum flux change would be obtained by making N as small as possible. Thus, if "voltage" control, as contrasted to "current" control is utilized, the voltage gain of an amplifier is increased if the number of turns is decreased. To insure voltage control it is necessary that the control be a low impedance source. In practice, it is possible to utilize so few control turns that the current drain on the control source necessary to maintain a given voltage across the control windings may become excessive. Consequently, the optimum number of turns on the control winding represents a compromise between the voltage, and the current limitations of the source.

The utilization of "voltage" control in the input control circuit where resistance is usually present due to control source limitations, is not usually possible. However, the two-stage bridge circuit is particularly well adapted for such operation and the output of the first stage is applied directly to the control windings of the second stage with no passive elements required. Thus, whatever voltage appears at the output of the first stage is applied directly to the control windings of the second stage. It has been experimentally determined that a ratio of about 1 to 100 between the output-stage control windings and the output-stage power windings, produces optimum performance. However, this will vary depending upon the impedance of the first stage when it is supplying control power to the second stage.

It is to be noted that the reference circuit and the power circuit produce a shunting effect on the control circuit which effect is detrimental during the flux setting half cycle during which control is effected. Since the reverse impedance of the rectifiers in the power circuit is high when no rectifier shunting resistors are utilized, the reflected impedance into the control circuit from the power circuit which is a function of the square of the ratio of the control turns to the power turns times the power circuit impedance, is large even though the turns ratio is much less than unity. Thus the shunting effect of the power circuit on the control circuit in the embodiment illustrated in Fig. 1 is small. By proper choice of the number of turns on the reference windings relative to the number of turns in the control windings and the value of the resistance of potentiometer 27, the shunting effect of the reference winding on the control circuit can also be made small. Thus, the ratio of output stage control turns to the output stage reference winding turns is always greater than the ratio of output-stage control winding turns to output stage power winding turns.

Figure 2:
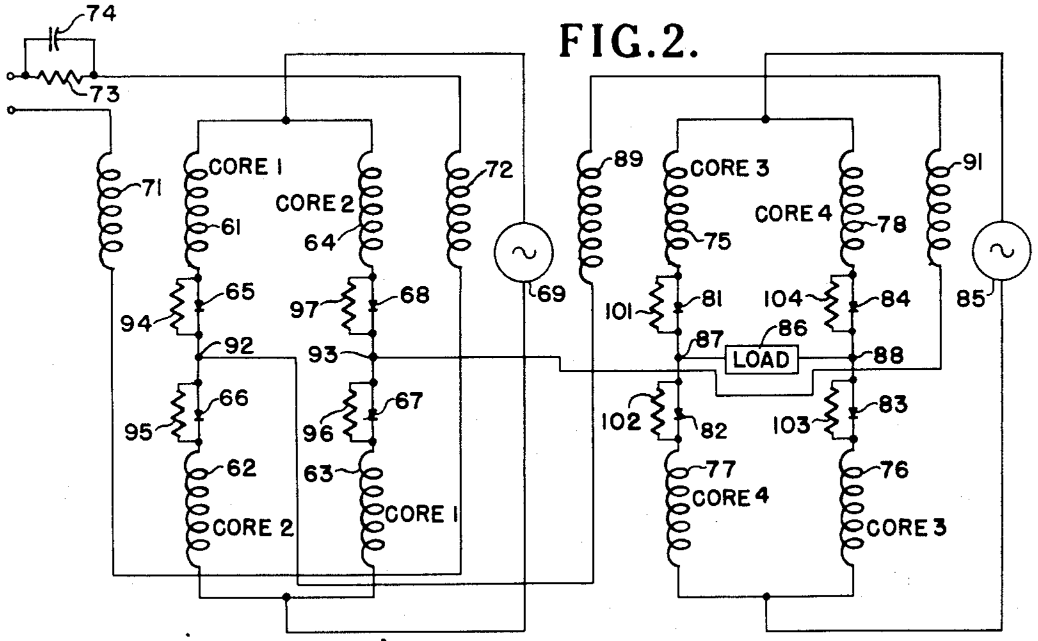
Fig. 2 is a schematic diagram of a bridge-type magnetic amplifier employing a modified form of circuitry for establishing the proper flux level in the reactors.

Reference is now made more specifically to Fig. 2. The basic bridge circuit of the input stage comprises power windings 61, 62, 63 and 64 and rectifiers 65, 66, 67 and 68, the bridge circuit being energized from a source of A. C. voltage 69. Power windings 61 and 63 are wound on the same reactor designated core 1 and windings 62 and 64 are wound on a second reactor designated core 2. As in the preceding embodiment, control is established by a control circuit comprising control windings 71 and 72 and parallel R-C circuit comprising resistor 73 and condenser 74, which control circuit is adapted to be energized by either an A. C., D. C. or a pulse control source or a combination thereof.

The output stage bridge circuit includes power windings 75 and 76 which are wound on the same reactor designated core 3 and windings 77 and 78 which are wound on core 4. Rectifiers 81, 82, 83 and 84 are arranged in the output bridge circuit such that the power windings 75–78 are energized by A. C. source 85 180° out of phase with the input circuit. The load 86 is coupled across the load terminals 87 and 88 of the output stage, and control windings 89 and 91 are coupled directly to the output terminals 92 and 93 of the input stage.

As in the preceding embodiment, the resistance in the input stage control circuit and consequently the number of control turns is determined by the control source impedance. However, in keeping with the concept of voltage control, the number of turns in the output stage control windings 89 and 91 is small as compared to the number of turns in the output stage power windings. Consequently, the input stage load impedance is small. During the operating half-cycle, the supply source potential applied to input stage bridge circuit is apportioned between the input stage load winding impedance, the rectifier forward impedance and the load circuit impedance. Increased gain in the input stage can thus be achieved by reducing the forward impedance of the rectifiers. However, because the individual rectifier cells of the dry-disk type commonly used cannot withstand high inverse potentials, a plurality of such cells must be utilized to reduce the inverse potential applied to each cell, when the supply voltage exceeds the maximum inverse potential that a single rectifier cell can withstand. In the two-stage circuit illustrated in Fig. 2 in which the control windings on the output stage are directly coupled to the input stage and in which the output stage control turns are low in keeping with the concept of voltage control, the input-stage load impedance [the impedance of the output stage control windings] is small. Under these conditions, the voltage drop across the input-stage bridge rectifiers [due to the forward impedance of the rectifiers] is a material factor in the reduction of gain in the amplifier. Shunting of rectifiers 65, 66, 67 and 68 by resistors 94, 95, 96 and 97 permits a reverse current to flow through the power windings 61—64, thereby providing a controlled back magnetomotive force for establishing the desired reference flux level during the non-operating half cycle. Further, shunting of the rectifiers minimizes the effect of changes in the ambient temperature on the inverse resistance of the rectifiers.

However, shunting of the rectifiers effects a reduction in amplifier gain which is attributable to the circulating currents which can flow through the shunts. Additionally since the turns ratio between the control windings and load windings is very small, the reflected impedance of the rectifier shunts is such as to produce an appreciable load on the control circuit.

It has been ascertained that by reducing the number of rectifier cells utilized in each leg of the bridge circuit to a minimum, preferably one cell, the gain of the amplifier may be increased somewhat and made almost equal to the gain achieved when separate reference circuits are utilized. Since the rectifier shunting resistor reduces the inverse potential applied to the rectifiers, the number of cells in each rectifier may be reduced without exceeding the allowable inverse potential on the rectifiers. Thus, a greater portion of the output of the input stage appears as useful signal at the output terminals 92 and 93 thereof. It is apparent, however, that the reduction in gain in the amplifier due to shunting of the rectifiers can be compensated by the increase in gain effected by reducing the number of rectifier cells in each rectifier only when the output impedance of the amplifier stage is of a low order comparable to the forward impedance of the bridge rectifiers. This can only be achieved by utilizing "voltage" control, i. e., a low number of turns in the control windings of the second or output stage which, in turn, is possible only with direct coupling to the input stage without passive elements. In contrast, conventional circuits employing a large number of control turns must utilize passive elements in order to improve the speed of response of the amplifier.

The output stage of the amplifier illustrated in Fig. 2 has the reference flux level set by resistors 101, 102, 103 and 104 in shunt with rectifiers 81, 82, 83 and 84 respectively.

In operation, the half-wave bridge circuit is energized from an A. C. source and the reference circuits adjusted so that both cores in each stage reach saturation or "fire" at the same time under no control signal conditions so that the output of each bridge stage is zero under those conditions. When a control signal is applied, the control M. M. F. aids the M. M. F. due to current flow through the power windings on one core and opposes the M. M. F. due to current flow through the power windings on the other core, thereby causing the cores to fire at relatively different times during each operating half cycle of the bridge. Thus, the output of the half-wave bridge circuit is a unidirectional signal having a fundamental A. C. component correlative in amplitude and phase with the magnitude and polarity of the control signal. By utilizing "voltage" control of the second or output stage, the gain of the multi-stage amplifier is increased with a very low number of control turns on the output stage, the latter control windings being directly coupled to the input stage without passive elements, thereby insuring that whatever signal appears at the output terminals of the input stage is applied to the output stage. As is apparent, the absence of passive elements in the connections between the stages is not only desirable in that it eliminates the signal loss across such elements which would otherwise result, but also the absence of such passive elements is necessary to effectuate "voltage" control of the output stage with the consequent increase in gain hereinbefore described. Similarly, voltage control may be utilized on the input stage subject to the limitations imposed by control source impedance.

In the embodiment illustrated in Fig. 1, the reference flux level is preset by reference windings which supply the power necessary to overcome the coercive force of the reactor core material, which reference windings also permit balancing the operating levels of the reactors even though the reactors have relatively different coercive forces. Although parallel connected reference windings are illustrated, it is to be understood that series connected reference windings may be utilized. However, the parallel connection permits balancing of the reactors as by potentiometers 27 and 45. In order to reduce the power loss due to circulating currents in the reference circuits, and which power losses are primarily supplied by the control source, rectifiers are provided in the reference circuits so as to render them operative only during the non-operating half cycle. In order to reduce the shunting effect of the reference circuit on the control windings, the ratio of the control turns to the reference turns and the impedance in the reference circuit is made such that the shunting effect of the reference circuit is small.

When it is necessary, due to ambient temperature changes, to minimize the temperature characteristics of the rectifiers, rectifier shunts may be utilized, which shunts can be chosen to preset the desired reference flux level in the reactors. When utilizing "voltage" control, the ratio of control turns to load turns is much less than one and consequently the load circuit produces a noticeable shunting effect on the control circuit. This shunting effect on the control due to the circulating currents which flow through the rectifier shunts reduces the gain of the amplifier. However, the output impedance of the first stage of a direct coupled two stage amplifier is of very low order when a low number of control turns are utilized in the output stage and increased gain can be achieved by reducing the number of rectifier cells in each rectifier of the bridge circuit to a minimum of preferably one. Since the shunting of the rectifiers reduces the inverse potential on the rectifiers, use of a small number of cells in each rectifier is permissible. Consequently, the loss in amplifier gain due to shunting of the rectifiers is compensated to a great extent by the increase in gain effected by reducing the forward impedance of the rectifiers. This compensation is effective only when the load impedance of the amplifier stage is of a low order of magnitude as is achieved by utilizing a small number of control turns on the output stage.

In either of the embodiments illustrated, input stage control may be effected by either A. C., D. C. or a pulse control source, or a combination thereof. Although an impedance matching and phase correcting network is illustrated, it is to be understood that it is provided only in certain applications to optimize performance and the character of the network will vary dependent on the nature of the control source.

Obviously many modifications and variations of the present invention are possible in the light of the above teachings. It is therefore to be understood that within the scope of the appended claims the invention may be practiced otherwise than as specifically described.

What is claimed as new and desired to be secured by Letters Patent of the United States is:

1. A multi-stage half-wave magnetic amplifier including first and second amplifier stages, each of said stages including four impedance elements connected in a closed circuit to form a bridge circuit, two of said impedance elements in each stage including power windings wound on separate reactor elements, asymmetrical conducting elements in each of the bridge circuits arranged so that each of the power windings in the first stage are energized during one-half cycle of a supply potential applied across opposite corners of the first-stage bridge circuit and the power windings in the second stage are energized in phase opposition to the first-stage during one-half cycle of a supply potential applied across opposite corners of the second-stage bridge circuit, means including input stage control windings for differentially varying the impedances of the power windings in said first stage bridge circuit in response to a contact signal, first stage and second stage reference windings on said reactor elements, first circuit means including asymmetrical conducting elements connected in series with said first stage reference windings for energizing said first stage reference windings during the other half cycle of the supply potential applied to opposite corners of said first stage bridge circuit, second circuit means including asymmetrical conducting elements connected in series with said second stage reference windings for energizing said second stage reference windings during the other half cycle of the supply potential applied to opposite corners of said second stage bridge circuit, variable impedance elements in said first and second circuit means for equalizing the flux levels set in the reactor elements of said first and second stages in the absence of a control signal to said input stage control windings, means including second stage control windings directly connected across the remaining corners of said first stage bridge circuit for differentially varying the impedances of the power windings in said second stage bridge circuit, and a load connected across the remaining corners of said second stage bridge circuit, the asymmetrical conducting elements in said second stage being connected to present the same polarity to said load as the first stage asymmetrical conducting elements present to said second stage control windings.

2. A multi-stage half-wave magnetic amplifier including first and second amplifier stages, each of said stages including reactor elements having four power windings thereon and connected in a closed circuit to form a bridge circuit, asymmetrical conducting elements in each of the bridge circuits arranged so that each of the power windings in the first stage are energized during one-half cycle of a supply potential applied across opposite corners of the first-stage bridge circuit and the power windings in the second stage are energized in phase opposition to the first stage during one-half cycle of a supply potential applied across opposite corners of the second-stage bridge circuit, means including input stage control windings for differentially varying the impedances of series adjacent power windings in said first stage bridge circuit in response to a control signal, first stage and second stage bias windings on said reactor elements, first circuit means including asymmetrical conducting elements connected in series with said first stage bias windings for energizing said first stage bias windings during the other half cycle of the supply potential applied to said first stage opposite corners, second circuit means including asymmetrical conducting elements connected in series with said second stage bias windings for energizing said second stage bias windings during the other half cycle of the supply potential applied to said second stage opposite corners, variable impedance elements in said first and second circuit means for equalizing the flux levels set in the reactor elements of said first and second stages in the absence of a control signal to said input stage control windings, means including second stage control windings directly connected across the remaining corners of said first stage bridge circuit for differentially varying the impedances of series adjacent power windings in said second stage bridge circuit, and a load connected across the remaining corners of said second stage bridge circuit, the asymmetrical conducting elements in said second stage being connected to present the same polarity to said load as the first stage asymmetrical conducting elements present to said second stage control windings.

3. A multi-stage half-wave magnetic amplifier including first and second amplifier stages, each stage comprising a pair of closed magnetic circuits, an inductive load winding on each magnetic circuit and a control circuit including a control winding on the core structure arranged in push-pull relation to the load windings; energizing means for supplying a pair of alternating current potentials in phase opposition, the load windings of said first stage being connected in parallel branch circuits to said energizing means so as to be energized solely by the first of said pair of potentials and the load windings of said second stage being connected in parallel branch circuits to said energizing means so as to be energized solely by the second of said pair of potentials; two unidirectional conducting devices in each branch circuit, said devices being poled in the same direction with respect to said energizing means; a flux-setting circuit for each branch circuit including a bias winding on the core structure and a unilateral conductive device connected in series therewith, the flux-setting circuits of said first stage being connected to be solely responsive to said first alternating current and the flux-setting circuits of said second stage being connected to be solely responsive to said second alternating current, said unilateral devices being poled in the same direction but opposite to the direction of said unidirectional devices; means for applying a control signal to the control circuit of said first stage; means conductively connecting the control circuit of said second stage at points between the two unidirectional conductive devices in each branch circuit of said first stage; and a load connected at points between the two unidirectional conductive devices in each branch circuit of said second stage.

References Cited in the file of this patent

UNITED STATES PATENTS

| | | |
|---|---|---|
| 2,126,790 | Logan | Aug. 16, 1938 |
| 2,464,639 | Fitzgerald | Mar. 15, 1949 |
| 2,512,317 | Edwards et al. | June 20, 1950 |
| 2,636,150 | McKenney et al. | Apr. 21, 1953 |

OTHER REFERENCES

Publication, "Magnetic Amplifiers of the Balance Detector Type," by W. A. Geyger, Dec. 2, 1949.